(12) United States Patent
Elkovitch et al.

(10) Patent No.: US 7,534,822 B2
(45) Date of Patent: May 19, 2009

(54) METHOD OF MAKING A FLAME RETARDANT POLY(ARYLENE ETHER)/POLYAMIDE COMPOSITION

(75) Inventors: Mark Elkovitch, Selkirk, NY (US); James Fishburn, Slingerlands, NY (US)

(73) Assignee: Sabic Innovative Plastics IP B.V. (NL)

( * ) Notice: Subject to any disclaimer, the term of this patent is extended or adjusted under 35 U.S.C. 154(b) by 453 days.

(21) Appl. No.: 11/271,279

(22) Filed: Nov. 11, 2005

(65) Prior Publication Data

US 2006/0111549 A1    May 25, 2006

Related U.S. Application Data

(63) Continuation-in-part of application No. 10/994,769, filed on Nov. 22, 2004.

(51) Int. Cl.
*C08J 3/22* (2006.01)
(52) U.S. Cl. .................... 523/351; 524/126; 524/133; 524/495; 524/496
(58) Field of Classification Search ................ 523/351; 524/126, 133, 495, 496
See application file for complete search history.

(56) References Cited

U.S. PATENT DOCUMENTS

| | | | |
|---|---|---|---|
| 2,071,250 A | 2/1937 | Carothers | 526/71 |
| 2,071,251 A | 2/1937 | Carothers | 524/31 |
| 2,130,523 A | 9/1938 | Carothers | 528/335 |
| 2,130,948 A | 9/1938 | Carothers | 151/591 |
| 2,241,322 A | 5/1941 | Hanford | 526/71 |
| 2,312,966 A | 5/1943 | Hanford | 528/329.1 |
| 2,512,606 A | 6/1950 | Bolton et al. | 528/340 |
| 3,379,792 A | 4/1968 | Finholt | 260/857 |
| 4,200,707 A * | 4/1980 | Richardson | 524/132 |
| 4,772,664 A | 9/1988 | Ueda et al. | |
| 4,863,996 A | 9/1989 | Nakazima et al. | |
| 4,970,272 A | 11/1990 | Gallucci | 525/397 |
| 5,071,894 A | 12/1991 | Weil et al. | |
| 5,132,365 A | 7/1992 | Gallucci | 525/92 B |
| 5,326,805 A | 7/1994 | Sicken et al. | 524/101 |
| 5,535,600 A | 7/1996 | Mills | 62/390 |
| 5,543,452 A | 8/1996 | Nakahashi | 524/430 |
| 5,714,550 A | 2/1998 | Shaw | 525/393 |
| 5,741,846 A | 4/1998 | Lohmeijer | 524/538 |
| 5,760,132 A | 6/1998 | McGaughan et al. | 525/66 |
| 5,843,340 A | 12/1998 | Silvi et al. | 252/511 |
| 6,111,016 A * | 8/2000 | Katayama et al. | 525/92 E |
| 6,166,115 A | 12/2000 | Landa | 524/115 |
| 6,207,736 B1 | 3/2001 | Nass et al. | 524/126 |
| 6,255,371 B1 | 7/2001 | Schlosser | 524/100 |
| 6,284,830 B1 * | 9/2001 | Gottschalk et al. | 524/449 |
| 6,344,158 B1 | 2/2002 | Schlosser et al. | 252/609 |
| 6,365,071 B1 | 4/2002 | Jenewein et al. | 252/609 |
| 6,384,128 B1 | 5/2002 | Wadahara et al. | 524/469 |
| 6,414,084 B1 | 7/2002 | Adedeji | 525/133 |
| 6,423,768 B1 * | 7/2002 | Khouri | 524/445 |
| 6,503,969 B1 | 1/2003 | Klatt et al. | 524/133 |
| 6,509,401 B1 | 1/2003 | Jenewein et al. | 524/116 |
| 6,547,992 B1 | 4/2003 | Schlosser et al. | 252/609 |
| 6,558,764 B2 | 5/2003 | Blom et al. | 428/36.92 |
| 6,569,974 B1 | 5/2003 | Sicken et al. | 526/274 |
| 6,576,700 B2 | 6/2003 | Patel | 524/508 |
| 6,586,315 B1 | 7/2003 | Dewa | 438/468 |
| 6,593,411 B2 | 7/2003 | Koevoets et al. | 524/451 |
| 6,599,446 B1 | 7/2003 | Todt et al. | 252/511 |
| 6,600,068 B2 | 7/2003 | Sicken et al. | 262/20 |
| 6,887,930 B2 | 5/2005 | Uchida et al. | |
| 2001/0007888 A1 | 7/2001 | Asano | |
| 2003/0073865 A1 | 4/2003 | Sicken et al. | 562/20 |
| 2003/0166762 A1 | 9/2003 | Koevoets et al. | |
| 2003/0176543 A1 | 9/2003 | Patel | 524/115 |
| 2003/0216533 A1 | 11/2003 | Sicken et al. | 526/274 |
| 2004/0049063 A1 | 3/2004 | Hoerold et al. | 556/17 |
| 2005/0075427 A1 | 4/2005 | Campbell et al. | |
| 2005/0250885 A1 | 11/2005 | Mercx et al. | |
| 2006/0058432 A1 | 3/2006 | Pergo et al. | |
| 2007/0040154 A1 * | 2/2007 | Murakami | 252/609 |

FOREIGN PATENT DOCUMENTS

| | | |
|---|---|---|
| EP | 0183195 A2 | 6/1986 |
| EP | 0332965 | 9/1989 |
| EP | 0501175 A1 | 9/1992 |
| EP | 0657498 | 6/1995 |
| EP | 0 699708 | 8/1995 |
| EP | 1522551 | 4/2005 |
| WO | WO 99/57187 | 11/1999 |
| WO | WO 02/28953 | 4/2002 |
| WO | 05017042 | 2/2005 |
| WO | WO2005/118698 A1 | 12/2005 |
| WO | 06055732 | 5/2006 |

OTHER PUBLICATIONS

International Search Report for International Application No. PCT/US2007/006949, mailed Aug. 22, 2007, 6 pages.
Japanese Patent No. JP2000-212434, published Aug. 2, 2000, abstract only.
U.S. Appl. No. 10/994,769, filed Nov. 22, 2004, Fishburn.
U.S. Appl. No. 11/271,278, filed Nov. 11, 2005, Ellkovitch et al.
U.S. Appl. No. 11/279,143, filed Apr. 10, 2006, Borade et al.
U.S. Appl. No. 11/279,148, filed Apr. 10, 2006, Borade et al.
European Publication No. 0183195 A2; Publication Date Jun. 4, 1986; Human Translation; 11 pages.
European Publication No. 0332965 A1; Publication Date Sep. 20, 1989Human Translation; 8 pages.

(Continued)

*Primary Examiner*—Peter Szekely
(74) *Attorney, Agent, or Firm*—Cantor Colburn LLP

(57) ABSTRACT

A method of making a composition comprises melt mixing a first mixture comprising a poly(arylene ether) and a compatibilizing agent to form a first melt mixture; and melt mixing a second mixture comprising the first melt mixture and a polyamide, an electrically conductive additive and a flame retardant masterbatch wherein the flame retardant masterbatch comprises a phosphinate and a thermoplastic resin.

23 Claims, No Drawings

OTHER PUBLICATIONS

European Publication No. 0501175 A1; Publication Date Sep. 2, 1992; Human Translation; 21 pages.

European Publication No. 0699708A2; Publication Date Mar. 6, 1996; Human Translation; 9 pages.

Japanese Application No. 2000-212434A; Publication Date Aug. 8, 2000; Human Translation; 63 pages.

International Search Report for International Application No. PCT/US2005/041724, mailed May 15, 2006.

U.S. Appl. No. 11/279,143, Borade et al. filed Apr. 10, 2006.

U.S. Appl. No. 11/279,148, Borade et al. filed Apr. 10, 2006.

Japanese Patent Application No. 2005-364323, Published Jul. 5, 2007, Manual Translation, 40 pages.

Japanese Patent Application No. 2006-308442, Published Jul. 19, 2007, Manual Translation, 65 pages.

Japanese Patent Application No. 2006-308441, Published Jul. 19, 2007, Manual Translation, 76 pages.

ISO 1133 "Plastics-Determination of the melt mass-flow rate (MFR) and the melt volume-flow rate (MVR) of thermoplastics" 11 pages, no date.

ISO 306 "Plastics-Thermoplastic materials-Determination of Vicat softening temperature (VST)" 10 pages, no date.

UL94 "Tests for Flammability of Plastic Materials for Parts in Devices and Appliances" 52 pages, no date.

WO 2007/055147; May 18, 2007; Human Translation; 43 pages.

WO2007/058169; May 24, 2007; Human Translation; 58 pages.

WO 2007/058170; May 24, 2007; Human Translation; 54 pages.

S. Horold et al., "A New Generation of Flame Retarded Polyamides Based on Phosphinates"[online ] [retreived on Feb. 6, 2007], 7 pages, retreived from http://ec.europa.eu/environment/waste/stakeholders/individual_bus/clariant/att_2.pdf.

* cited by examiner

METHOD OF MAKING A FLAME RETARDANT POLY(ARYLENE ETHER)/POLYAMIDE COMPOSITION

CROSS REFERENCE TO RELATED APPLICATIONS

This application is a continuation-in-part of U.S. patent application Ser. No. 10/994,769 filed on Nov. 22, 2004, which is herein incorporated by reference in its entirety.

BACKGROUND OF INVENTION

Poly(arylene ether) resins have been blended with polyamide resins to provide compositions having a wide variety of beneficial properties such as heat resistance, chemical resistance, impact strength, hydrolytic stability and dimensional stability.

These beneficial properties are desirable in a wide variety of applications and the shapes and sizes of the parts required for these applications vary widely. As a result there is a variety of forming or molding methods employed such as injection molding, compression molding and extrusion. Each molding method requires a different set of physical characteristics for the polymer being molded. A polymer blend that is suitable for high shear/high pressure processes such as injection molding may not be suitable for low pressure/low shear processes such as blow molding, sheet extrusion and profile extrusion. For example, profile extrusion requires that a polymer blend be forced through a shaped die (a profile) and maintain the extruded shape until cooled. The extruded shape may be further manipulated while the polymer blend is still malleable through the use of shaping tools and the shaped profile must retain its shape after manipulation. Therefore polymer blends employed in low pressure/low shear processes typically have fairly high melt viscosity (low melt flow indices) as well as high melt strength.

In some applications it is desirable that the extruded shape be electrostatically coatable which requires use of an electrically conductive material. Unfortunately the inclusion of electrically conductive additives in high melt viscosity blends can be problematic, particularly in a multi phase polymer blends such as a poly(arylene ether)/polyamide blend. Furthermore, flame retardancy of electrically conductive high melt viscosity blends can be difficult to achieve.

BRIEF DESCRIPTION OF THE INVENTION

The foregoing need is addressed by a composition comprising a poly(arylene ether), a polyamide, electrically conductive additive, an impact modifier, and a phosphinate.

In another embodiment, a method of making a composition comprises:
melt mixing a first mixture comprising a poly(arylene ether) and a compatibilizing agent to form a first melt mixture;
melt mixing a second mixture comprising the first melt mixture and a polyamide, electrically conductive additive and a flame retardant masterbatch wherein the flame retardant masterbatch comprises a phosphinate and a thermoplastic resin.

DETAILED DESCRIPTION

As mentioned above low pressure/low shear molding processes require materials with melt strength sufficiently high and a melt volume rate (MVR) sufficiently low to maintain the desired shape after leaving the extrusion die or mold. Additionally it is desirable for the materials to be sufficiently electrically conductive to permit electrostatic coating and have a flame retardancy rating of V-1 or better according to Underwriter's Laboratory Bulletin 94 entitled "Tests for Flammability of Plastic Materials, UL94" (UL94) at a thickness of 2.0 millimeters (mm).

A composition useful in low pressure/low shear molding processes comprises a poly(arylene ether), a polyamide, an impact modifier, electrically conductive additive, and a phosphinate. The melt volume rate of the composition is compatible with low pressure/low shear processes. In one embodiment the composition has a melt volume rate less than or equal to 25 cubic centimeters (cc)/10 min, or, more specifically, less than or equal to 20 cc/10 min, or, even more specifically, less than or equal to 16 cc/10 min, as determined by Melt Volume Rate test ISO 1133 performed at 300° C. with a load of 5 kilograms (kg).

The composition may have a Vicat B120 greater than or equal to 170° C., or, more specifically, greater than or equal to 180° C., or, even more specifically, greater than or equal to 190° C. Vicat B120 is determined using ISO 306 standards. A Vicat B120 greater than or equal to 170° C. ensures that the composition has adequate heat performance for electrostatic coating.

Specific volume resistivity (SVR) is a measure of the leakage current directly through a material. It is defined as the electrical resistance through a one-centimeter cube of material and is expressed in ohm-cm. The lower the specific volume resistivity of a material, the more conductive the material is. In one embodiment the composition has a specific volume resistivity less than or equal to $10^6$ ohm-cm, or, more specifically, less than or equal to $10^5$, or, even more specifically, less than or equal to $10^4$. Specific volume resistivity may be determined as described in the Examples. Surprisingly the inclusion of the phosphinate reduces the resistivity relative to a comparable composition lacking phosphinate. As a result it is possible to achieve the same or lower resistivity in a composition comprising phosphinate and electrically conductive additive than a composition comprising electrically conductive additive without phosphinate.

In some embodiments it may be advantageous for the composition to have a volatiles content sufficiently low to prevent or limit the amount of build up on the molding equipment.

The terms "a" and "an" herein do not denote a limitation of quantity, but rather denote the presence of at least one of the referenced item. All ranges disclosed herein are inclusive and combinable (e.g., ranges of "less than or equal to 25 wt %, or, more specifically, 5 wt % to 20 wt %," is inclusive of the endpoints and all intermediate values of the ranges of "5 wt % to 25 wt %," etc.).

As used herein, a "poly(arylene ether)" comprises a plurality of structural units of the formula (I):

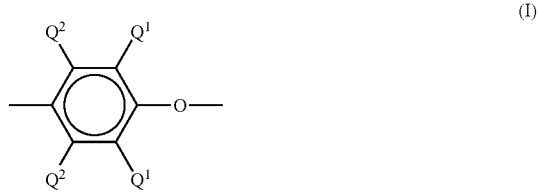

wherein for each structural unit, each $Q^1$ and each $Q^2$ is independently hydrogen, halogen, primary or secondary lower alkyl (e.g., an alkyl containing 1 to 7 carbon atoms), phenyl, haloalkyl, aminoalkyl, alkenylalkyl, alkynylalkyl, aryl, hydrocarbonoxy, and halohydrocarbonoxy wherein at least two carbon atoms separate the halogen and oxygen atoms. In some embodiments, each $Q^1$ is independently alkyl or phenyl, for example, $C_{1-4}$ alkyl, and each $Q^2$ is independently hydrogen or methyl. The poly(arylene ether) may comprise molecules having aminoalkyl-containing end group(s), typically located in an ortho position to the hydroxy group. Also frequently present are tetramethyl diphenylquinone (TMDQ) end groups, typically obtained from reaction mixtures in which tetramethyl diphenylquinone by-product is present.

The poly(arylene ether) may be in the form of a homopolymer; a copolymer; a graft copolymer; an ionomer; a block copolymer, for example comprising arylene ether units and blocks derived from alkenyl aromatic compounds; as well as combinations comprising at least one of the foregoing. Poly(arylene ether) includes polyphenylene ether comprising 2,6-dimethyl-1,4-phenylene ether units optionally in combination with 2,3,6-trimethyl-1,4-phenylene ether units.

The poly(arylene ether) may be prepared by the oxidative coupling of monohydroxyaromatic compound(s) such as 2,6-xylenol and/or 2,3,6-trimethylphenol. Catalyst systems are generally employed for such coupling; they can contain heavy metal compound(s) such as a copper, manganese or cobalt compound, usually in combination with various other materials such as a secondary amine, tertiary amine, halide or combination of two or more of the foregoing.

The poly(arylene ether) can have a number average molecular weight of 3,000 to 40,000 grams per mole (g/mol) and/or a weight average molecular weight of about 5,000 to about 80,000 g/mol, as determined by gel permeation chromatography using monodisperse polystyrene standards, a styrene divinyl benzene gel at 40° C. and samples having a concentration of 1 milligram per milliliter of chloroform. The poly(arylene ether) can have an initial intrinsic viscosity of 0.10 to 0.60 deciliters per gram (dl/g), or, more specifically, 0.29 to 0.48 dl/g, as measured in chloroform at 25° C. Initial intrinsic viscosity is defined as the intrinsic viscosity of the poly(arylene ether) prior to melt mixing with the other components of the composition and final intrinsic viscosity is defined as the intrinsic viscosity of the poly(arylene ether) after melt mixing with the other components of the composition. As understood by one of ordinary skill in the art the viscosity of the poly(arylene ether) may be up to 30% higher after melt mixing. The percentage of increase can be calculated by (final intrinsic viscosity−initial intrinsic viscosity)/initial intrinsic viscosity. Determining an exact ratio, when two initial intrinsic viscosities are used, will depend somewhat on the exact intrinsic viscosities of the poly(arylene ether) used and the ultimate physical properties that are desired.

In one embodiment the poly(arylene ether) has a glass transition temperature (Tg) as determined by differential scanning calorimetry (DSC at 20° C./minute ramp), of 160° C. to 250° C. Within this range the Tg may be greater than or equal to 180° C., or, more specifically, greater than or equal to 200° C. Also within this range the Tg may be less than or equal to 240° C., or, more specifically, less than or equal to 230° C.

The composition comprises poly(arylene ether) in an amount of 15 to 65 weight percent. Within this range, the poly(arylene ether) may be present in an amount greater than or equal to 30 weight percent, or, more specifically, in an amount greater than or equal to 35 weight percent, or, even more specifically, in an amount greater than or equal to 40 weight percent. Also within this range the poly(arylene ether) may be present in an amount less than or equal to 60 weight percent, or, more specifically, less than or equal to 55 weight percent, or, even more specifically, less than or equal to 50 weight percent. Weight percent is based on the total weight of the thermoplastic composition.

Polyamide resins, also known as nylons, are characterized by the presence of an amide group (—C(O)NH—), and are described in U.S. Pat. No. 4,970,272. Exemplary polyamide resins include, but are not limited to, nylon-6; nylon-6,6; nylon-4; nylon-4,6; nylon-12; nylon-6,10; nylon 6,9; nylon-6,12; amorphous polyamide resins; nylon 6/6T and nylon 6,6/6T with triamine contents below 0.5 weight percent; nylon 9T; and combinations of two or more of the foregoing polyamides. In one embodiment, the polyamide resin comprises nylon 6 and nylon 6,6. In one embodiment the polyamide resin or combination of polyamide resins has a melting point (Tm) greater than or equal to 171° C. When the polyamide comprises a super tough polyamide, i.e. a rubber-toughed polyamide, the composition may or may not contain a separate impact modifier.

Polyamide resins may be obtained by a number of well known processes such as those described in U.S. Pat. Nos. 2,071,250; 2,071,251; 2,130,523; 2,130,948; 2,241,322; 2,312,966; and 2,512,606. Polyamide resins are commercially available from a wide variety of sources.

Polyamide resins having an intrinsic viscosity of up to 400 milliliters per gram (ml/g) can be used, or, more specifically, having a viscosity of 90 to 350 ml/g, or, even more specifically, having a viscosity of 110 to 240 ml/g, as measured in a 0.5 wt % solution in 96 wt % sulfuric acid in accordance with ISO 307.

The polyamide may have a relative viscosity of up to 6, or, more specifically, a relative viscosity of 1.89 to 5.43, or, even more specifically, a relative viscosity of 2.16 to 3.93. Relative viscosity is determined according to DIN 53727 in a 1 wt % solution in 96 wt % sulfuric acid.

In one embodiment, the polyamide resin comprises a polyamide having an amine end group concentration greater than or equal to 35 microequivalents amine end group per gram of polyamide (μeq/g) as determined by titration with HCl. Within this range, the amine end group concentration may be greater than or equal to 40 μeq/g, or, more specifically, greater than or equal to 45 μeq/g. Amine end group content may be determined by dissolving the polyamide in a suitable solvent, optionally with heat. The polyamide solution is titrated with 0.01 Normal hydrochloric acid (HCl) solution using a suitable indication method. The amount of amine end groups is calculated based the volume of HCl solution added to the sample, the volume of HCl used for the blank, the molarity of the HCl solution and the weight of the polyamide sample.

In one embodiment, the polyamide comprises greater than or equal to 50 weight percent, based on the total weight of the polyamide, of a polyamide having a melt temperature within 35%, or more specifically within 25%, or, even more specifically, within 15% of the glass transition temperature (Tg) of the poly(arylene ether). As used herein having a melt temperature within 35% of the glass transition temperature of the polyarylene ether is defined as having a melt temperature that is greater than or equal to (0.65×Tg of the poly(arylene ether)) and less than or equal to (1.35×Tg of the poly(arylene ether)).

The composition comprises polyamide in an amount of 30 to 85 weight percent. Within this range, the polyamide may be present in an amount greater than or equal to 33 weight percent, or, more specifically, in an amount greater than or equal to 38 weight percent, or, even more specifically, in an amount greater than or equal to 40 weight percent. Also within this range, the polyamide may be present in an amount less than or equal to 60 weight percent, or, more specifically, less than or equal to 55 weight percent, or, even more specifically, less than or equal to 50 weight percent. Weight percent is based on the total weight of the thermoplastic composition When used herein, the expression "compatibilizing agent" refers to polyfunctional compounds which interact with the poly(arylene ether), the polyamide resin, or both. This interaction may be chemical (e.g., grafting) and/or physical (e.g., affecting the surface characteristics of the dispersed phases). In either instance the resulting compatibilized poly(arylene ether)/polyamide composition appears to exhibit improved compatibility, particularly as evidenced by enhanced impact strength, mold knit line strength and/or elongation. As used herein, the expression "compatibilized poly(arylene ether)/polyamide blend" refers to those compositions which have been physically and/or chemically compatibilized with an agent as discussed above, as well as those compositions which are physically compatible without such agents, as taught in U.S. Pat. No. 3,379,792.

Examples of the various compatibilizing agents that may be employed include: liquid diene polymers, epoxy compounds, oxidized polyolefin wax, quinones, organosilane compounds, polyfunctional compounds, functionalized poly(arylene ether) and combinations comprising at least one of the foregoing. Compatibilizing agents are further described in U.S. Pat. Nos. 5,132,365 and 6,593,411 as well as U.S. Patent Application No. 2003/0166762.

In one embodiment, the compatibilizing agent comprises a polyfunctional compound. Polyfunctional compounds which may be employed as a compatibilizing agent are of three types. The first type of polyfunctional compounds are those having in the molecule both (a) a carbon-carbon double bond or a carbon-carbon triple bond and (b) at least one carboxylic acid, anhydride, amide, ester, imide, amino, epoxy, orthoester, or hydroxy group. Examples of such polyfunctional compounds include maleic acid; maleic anhydride; fumaric acid; glycidyl acrylate, itaconic acid; aconitic acid; maleimide; maleic hydrazide; reaction products resulting from a diamine and maleic anhydride, maleic acid, fumaric acid, etc.; dichloro maleic anhydride; maleic acid amide; unsaturated dicarboxylic acids (e.g., acrylic acid, butenoic acid, methacrylic acid, t-ethylacrylic acid, pentenoic acid, decenoic acids, undecenoic acids, dodecenoic acids, linoleic acid, etc.); esters, acid amides or anhydrides of the foregoing unsaturated carboxylic acids; unsaturated alcohols (e.g. alkyl alcohol, crotyl alcohol, methyl vinyl carbinol, 4-pentene-1-ol, 1,4-hexadiene-3-ol, 3-butene-1,4-diol, 2,5-dimethyl-3-hexene-2,5-diol and alcohols of the formula $C_nH_{2n-5}OH$, $C_nH_{2n-7}OH$ and $C_nH_{2n-9}OH$, wherein n is a positive integer less than or equal to 30); unsaturated amines resulting from replacing from replacing the —OH group(s) of the above unsaturated alcohols with NH2 groups; functionalized diene polymers and copolymers; and combinations comprising one or more of the foregoing. In one embodiment, the compatibilizing agent comprises maleic anhydride and/or fumaric acid.

The second type of polyfunctional compatibilizing agents are characterized as having both (a) a group represented by the formula (OR) wherein R is hydrogen or an alkyl, aryl, acyl or carbonyl dioxy group and (b) at least two groups each of which may be the same or different selected from carboxylic acid, acid halide, anhydride, acid halide anhydride, ester, orthoester, amide, imido, amino, and various salts thereof. Typical of this group of compatibilizers are the aliphatic polycarboxylic acids, acid esters and acid amides represented by the formula:

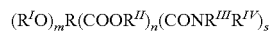

$(R^IO)_mR(COOR^{II})_n(CONR^{III}R^{IV})_s$ wherein R is a linear or branched chain, saturated aliphatic hydrocarbon having 2 to 20, or, more specifically, 2 to 10, carbon atoms; $R^I$ is hydrogen or an alkyl, aryl, acyl, or carbonyl dioxy group having 1 to 10, or, more specifically, 1 to 6, or, even more specifically, 1 to 4 carbon atoms; each $R^{II}$ is independently hydrogen or an alkyl or aryl group having 1 to 20, or, more specifically, 1 to 10 carbon atoms; each $R^{III}$ and $R^{IV}$ are independently hydrogen or an alkyl or aryl group having 1 to 10, or, more specifically, 1 to 6, or, even more specifically, 1 to 4, carbon atoms; m is equal to 1 and (n+s) is greater than or equal to 2, or, more specifically, equal to 2 or 3, and n and s are each greater than or equal to zero and wherein $(OR^I)$ is alpha or beta to a carbonyl group and at least two carbonyl groups are separated by 2 to 6 carbon atoms. Obviously, $R^I$, $R^{II}$, $R^{III}$, and $R^{IV}$ cannot be aryl when the respective substituent has less than 6 carbon atoms.

Suitable polycarboxylic acids include, for example, citric acid, malic acid, agaricic acid; including the various commercial forms thereof, such as for example, the anhydrous and hydrated acids; and combinations comprising one or more of the foregoing. In one embodiment, the compatibilizing agent comprises citric acid. Illustrative of esters useful herein include, for example, acetyl citrate, mono- and/or distearyl citrates, and the like. Suitable amides useful herein include, for example, N,N'-diethyl citric acid amide; N-phenyl citric acid amide; N-dodecyl citric acid amide; N,N'-didodecyl citric acid amide; and N-dodecyl malic acid. Derivates include the salts thereof, including the salts with amines and the alkali and alkaline metal salts. Exemplary of suitable salts include calcium malate, calcium citrate, potassium malate, and potassium citrate.

The third type of polyfunctional compatibilizing agents are characterized as having in the molecule both (a) an acid halide group and (b) at least one carboxylic acid, anhydride, ester, epoxy, orthoester, or amide group, preferably a carboxylic acid or anhydride group. Examples of compatibilizers within this group include trimellitic anhydride acid chloride, chloroformyl succinic anhydride, chloro formyl succinic acid, chloroformyl glutaric anhydride, chloroformyl glutaric acid, chloroacetyl succinic anhydride, chloroacetylsuccinic acid, trimellitic acid chloride, and chloroacetyl glutaric acid. In one embodiment, the compatibilizing agent comprises trimellitic anhydride acid chloride.

Some polyamides require particular types of compatibilizing agents. For example, monomeric compatibilizing agents or monomeric compatibilizing agents reacted with poly(arylene ether) are useful with nylon 9T but polymeric compatibilizing agents are generally unsuccessful.

The foregoing compatibilizing agents may be added directly to the melt blend or pre-reacted with either or both of the poly(arylene ether) and polyamide, as well as with other resinous materials employed in the preparation of the composition. With many of the foregoing compatibilizing agents, particularly the polyfunctional compounds, even greater improvement in compatibility is found when at least a portion of the compatibilizing agent is pre-reacted, either in the melt or in a solution of a suitable solvent, with all or a part of the poly(arylene ether). It is believed that such pre-reacting may cause the compatibilizing agent to react with the polymer and, consequently, functionalize the poly(arylene ether). For example, the poly(arylene ether) may be pre-reacted with maleic anhydride to form an anhydride functionalized poly (arylene ether) which has improved compatibility with the polyamide compared to a non-functionalized poly(arylene ether).

Where the compatibilizing agent is employed in the preparation of the compositions, the amount used will be dependent upon the specific compatibilizing agent chosen and the specific polymeric system to which it is added.

Impact modifiers can be block copolymers containing alkenyl aromatic repeating units, for example, A-B diblock copolymers and A-B-A triblock copolymers having of one or two alkenyl aromatic blocks A (blocks having alkenyl aromatic repeating units), which are typically styrene blocks, and a rubber block, B, which is typically an isoprene or butadiene block. The butadiene block may be partially or completely hydrogenated. Mixtures of these diblock and triblock copolymers may also be used as well as mixtures of non-hydrogenated copolymers, partially hydrogenated copolymers, fully hydrogenated copolymers, radial teleblock copolymers, tapered block copolymers, and combinations of two or more of the foregoing.

A-B and A-B-A copolymers include, but are not limited to, polystyrene-polybutadiene, polystyrene-poly(ethylene-propylene), polystyrene-polyisoprene, poly($\alpha$-methylstyrene)-polybutadiene, polystyrene-polybutadiene-polystyrene (SBS), polystyrene-poly(ethylene-propylene)-polystyrene, polystyrene-polyisoprene-polystyrene and poly(alpha-methylstyrene)-polybutadiene-poly(alpha-methylstyrene), polystyrene-poly(ethylene-propylene-styrene)-polystyrene, and the like. Mixtures of the aforementioned block copolymers are also useful. Such A-B and A-B-A block copolymers are available commercially from a number of sources, including Phillips Petroleum under the trademark SOLPRENE, Kraton Polymers, under the trademark KRATON, Dexco under the trademark VECTOR, Asahi Kasai under the trademark TUFTEC, Total Petrochemicals under the trademarks FINAPRENE and FINACLEAR, Kuraray under the trademark SEPTON, and Chevron Phillips Chemical Company under the tradename K-RESIN.

In one embodiment, the impact modifier comprises polystyrene-poly(ethylene-butylene)-polystyrene, polystyrene-poly(ethylene-propylene) or a combination of the foregoing.

Another type of impact modifier is essentially free of alkenyl aromatic repeating units and comprises one or more moieties selected from the group consisting of carboxylic acid, anhydride, epoxy, oxazoline, and orthoester. Essentially free is defined as having alkenyl aromatic units present in an amount less than 5 weight percent, or, more specifically, less than 3 weight percent, or, even more specifically less than 2 weight percent, based on the total weight of the block copolymer. When the impact modifier comprises a carboxylic acid moiety the carboxylic acid moiety may be neutralized with an ion, preferably a metal ion such as zinc or sodium. It may be an alkylene-alkyl (meth)acrylate copolymer and the alkylene groups may have 2 to 6 carbon atoms and the alkyl group of the alkyl (meth)acrylate may have 1 to 8 carbon atoms. This type of polymer can be prepared by copolymerizing an olefin, for example, ethylene and propylene, with various (meth) acrylate monomers and/or various maleic-based monomers. The term (meth)acrylate refers to both the acrylate as well as the corresponding methacrylate analogue. Included within the term (meth)acrylate monomers are alkyl (meth)acrylate monomers as well as various (meth)acrylate monomers containing at least one of the aforementioned reactive moieties.

In a one embodiment, the copolymer is derived from ethylene, propylene, or mixtures of ethylene and propylene, as the alkylene component; butyl acrylate, hexyl acrylate, or propyl acrylate as well as the corresponding alkyl (methyl) acrylates, for the alkyl (meth)acrylate monomer component, with acrylic acid, maleic anhydride, glycidyl methacrylate or a combination thereof as monomers providing the additional reactive moieties (i.e., carboxylic acid, anhydride, epoxy).

Exemplary first impact modifiers are commercially available from a variety of sources including ELVALOY PTW, SURLYN, and FUSABOND, all of which are available from DuPont.

The aforementioned impact modifiers can be used singly or in combination.

The composition may comprise an impact modifier or a combination of impact modifiers, in an amount of 1 to 15 weight percent. Within this range, the impact modifier may be present in an amount greater than or equal to 1.5 weight percent, or, more specifically, in an amount greater than or equal to 2 weight percent, or, even more specifically, in an amount greater than or equal to 4 weight percent. Also within this range, the impact modifier may be present in an amount less than or equal to 13 weight percent, or, more specifically, less than or equal to 12 weight percent, or, even more specifically, less than or equal to 10 weight percent. Weight percent is based on the total weight of the thermoplastic composition.

The composition may optionally further comprise a rubber-modified poly(alkenyl aromatic) resin. A rubber-modified poly(alkenyl aromatic) resin comprises a polymer derived from at least one of the alkenyl aromatic monomers described above, and further comprises a rubber modifier in the form of a blend and/or a graft. The rubber modifier may be a polymerization product of at least one $C_4$-$C_{10}$ nonaromatic diene monomer, such as butadiene or isoprene. The rubber-modified poly(alkenyl aromatic) resin comprises about 98 to about 70 weight percent of the poly(alkenyl aromatic) resin and about 2 to about 30 weight percent of the rubber modifier, preferably about 88 to about 94 weight percent of the poly (alkenyl aromatic) resin and about 6 to about 12 weight percent of the rubber modifier.

Exemplary rubber-modified poly(alkenyl aromatic) resins include the styrene-butadiene copolymers containing about 88 to about 94 weight percent styrene and about 6 to about 12 weight percent butadiene. These styrene-butadiene copolymers, also known as high-impact polystyrenes, are commercially available as, for example, GEH 1897 from General Electric Company, and BA 5350 from Chevron Chemical Company.

The composition may comprise the rubber-modified poly (alkenyl aromatic) resin in an amount up to 25 weight percent, or, more specifically up to 20 weight percent, or, even more specifically, up to 18 weight percent, based on the total weight of the composition.

The electrically conductive additive may comprise electrically conductive carbon black, carbon nanotubes, carbon fibers or a combination of two or more of the foregoing. Electrically conductive carbon blacks are commercially available and are sold under a variety of trade names, including but not limited to S.C.F. (Super Conductive Furnace), E.C.F. (Electric Conductive Furnace), Ketjen Black EC (available from Akzo Co., Ltd.) or acetylene black. In some embodiments the electrically conductive carbon black has an average particle size less than or equal to 200 nanometers (nm), or, more specifically, less than or equal to 100 nm, or, even more specifically, less than or equal to 50 nm. The electrically conductive carbon blacks may also have surface areas greater than 200 square meter per gram ($m^2/g$), or, more specifically, greater than 400 $m^2/g$, or, even more specifically, greater than 1000 $m^2/g$. The electrically conductive carbon black may have a pore volume greater than or equal to 40 cubic centimeters per hundred grams ($cm^3/100$ g), or, more specifically, greater than or equal to 100 $cm^3/100$ g, or, even more specifically, greater than or equal to 150 $cm^3/100$ g, as determined by dibutyl phthalate absorption.

Carbon nanotubes that can be used include single wall carbon nanotubes (SWNTs), multiwall carbon nanotubes (MWNTs), vapor grown carbon fibers (VGCF) and combinations comprising two or more of the foregoing.

Single wall carbon nanotubes (SWNTs) may be produced by laser-evaporation of graphite, carbon arc synthesis or a high-pressure carbon monoxide conversion process (HIPCO) process. These SWNTs generally have a single wall comprising a graphene sheet with outer diameters of 0.7 to 2.4 nanometers (nm). The SWNTs may comprise a mixture of metallic SWNTs and semi-conducting SWNTs. Metallic SWNTs are those that display electrical characteristics similar to metals, while the semi-conducting SWNTs are those that are electrically semi-conducting. In some embodiments it is desirable to have the composition comprise as large a fraction of metallic SWNTs as possible. SWNTs may have aspect ratios of greater than or equal to 5, or, more specifically, greater than or equal to 100, or, even more specifically, greater than or equal to 1000. While the SWNTs are generally closed structures having hemispherical caps at each end of the respective tubes, it is envisioned that SWNTs having a single open end or both open ends may also be used. The SWNTs generally comprise a central portion, which is hollow, but may be filled with amorphous carbon.

In one embodiment the SWNTs comprise metallic nanotubes in an amount of greater than or equal to 1 wt %, or, more specifically, greater than or equal to 20 wt %, or, more specifically, greater than or equal to 30 wt %, or, even more specifically greater than or equal to 50 wt %, or, even more specifically, greater than or equal to 99.9 wt % of the total weight of the SWNTs.

In one embodiment the SWNTs comprise semi-conducting nanotubes in an amount of greater than or equal to 1 wt %, or, more specifically, greater than or equal to 20 wt %, or, more specifically, greater than or equal to 30 wt %, or, even more specifically, greater than or equal to 50 wt %, or, even more specifically, greater than or equal to 99.9 wt % of the total weight of the SWNTs.

MWNTs may be produced by processes such as laser ablation and carbon arc synthesis. MWNTs have at least two graphene layers bound around an inner hollow core. Hemispherical caps generally close both ends of the MWNTs, but it is also possible to use MWNTs having only one hemispherical cap or MWNTs which are devoid of both caps. MWNTs generally have diameters of 2 to 50 nm. Within this range, the MWNTs may have an average diameter less than or equal to 40, or, more specifically, less than or equal to 30, or, even more specifically less than or equal to 20 nm. MWNTs may have an average aspect ratio greater than or equal to 5, or, more specifically, greater than or equal to 100, or, even more specifically greater than or equal to 1000.

Vapor grown carbon fibers (VGCF) are generally manufactured in a chemical vapor deposition process. VGCF having "tree-ring" or "fishbone" structures may be grown from hydrocarbons in the vapor phase, in the presence of particulate metal catalysts at moderate temperatures, i.e., 800 to 1500° C. In the "tree-ring" structure a multiplicity of substantially graphitic sheets are coaxially arranged about the core. In the "fishbone" structure, the fibers are characterized by graphite layers extending from the axis of the hollow core.

VGCF having diameters of 3.5 to 2000 nanometers (nm) and aspect ratios greater than or equal to 5 may be used. VGCF may have diameters of 3.5 to 500 nm, or, more specifically 3.5 to 100 nm, or, even more specifically 3.5 to 50 nm. VGCF may have an average aspect ratios greater than or equal to 100, or, more specifically, greater than or equal to 1000.

Various types of conductive carbon fibers may also be used in the composition. Carbon fibers are generally classified according to their diameter, morphology, and degree of graphitization (morphology and degree of graphitization being interrelated). These characteristics are presently determined by the method used to synthesize the carbon fiber. For example, carbon fibers having diameters down to 5 micrometers, and graphene ribbons parallel to the fiber axis (in radial, planar, or circumferential arrangements) are produced commercially by pyrolysis of organic precursors in fibrous form, including phenolics, polyacrylonitrile (PAN), or pitch.

The carbon fibers generally have a diameter of greater than or equal to 1,000 nanometers (1 micrometer) to 30 micrometers. Within this range fibers having sizes of greater than or equal to 2, or, more specifically, greater than or equal to 3, or, more specifically greater than or equal to 4 micrometers may be used. Also within this range fibers having diameters of less than or equal to 25, or, more specifically, less than or equal to 15, or, even more specifically less than or equal to 11 micrometers may be used.

The composition comprises a sufficient amount of electrically conductive additive to achieve a specific volume resistivity less than or equal to $10^6$ ohm-cm. For example, the composition may comprise electrically conductive carbon black and/or carbon fibers and/or carbon nanotubes in an amount of 1 to 20 weight percent. Within this range, the electrically conductive additive may be present in an amount greater than or equal to 1.2 weight percent, or, more specifically, in an amount greater than or equal to 1.4 weight percent, or, even more specifically, in an amount greater than or equal to 1.6 weight percent. Also within this range, the electrically conductive carbon filler may be present in an amount less than or equal to 15 weight percent, or, more specifically, less than or equal to 10 weight percent, or, even more specifically, less than or equal to 5 weight percent. Weight percent is based on the total weight of the thermoplastic composition.

It is interesting to note that the amount of electrically conductive additive required to achieve a particular level of conductivity is highly dependent upon the electrically conductive additive. For instance, compositions comprising MWNT or VGCF in amounts of 1 to 1.2 weight percent, based on the total weight of the composition, have electrical conductivity commensurate with the electrical conductivity of compositions comprising conductive carbon black in an amount greater than 1.7 weight percent, based on the total weight of the composition. The difference in the amounts of electrically conductive additive can have a significant impact on physical properties such as flammability, impact strength and tensile elongation.

In some embodiments it is desirable to incorporate a sufficient amount of electrically conductive additive to achieve a specific volume resistivity that is sufficient to permit the composition to dissipate electrostatic charges or to be thermally dissipative.

The phosphinate may comprise one or more phosphinates of formula II, III, or IV

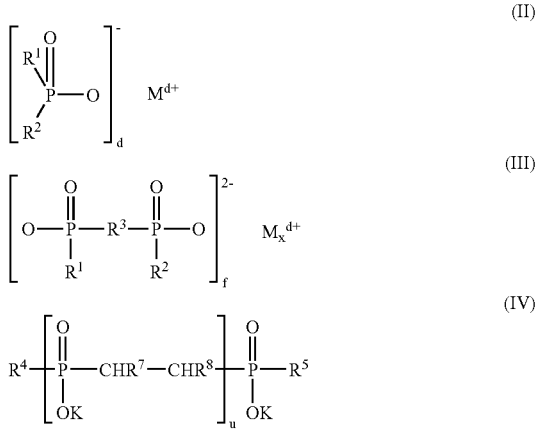

wherein $R^1$ and $R^2$ are independently $C_1$-$C_6$ alkyl, phenyl, or aryl; $R^3$ is independently $C_1$-$C_{10}$ alkylene, $C_6$-$C_{10}$ arylene, $C_6$-$C_{10}$ alkylarylene, or $C_6$-$C_{10}$ arylalkylene; M is calcium, magnesium, aluminum, zinc or a combination comprising one or more of the foregoing; d is 2 or 3; f is 1 or 3; x is 1 or 2; each $R^4$ and $R^5$ are independently a hydrogen group or a vinyl group of the formula —$CR^7$=$CHR^8$; $R^7$ and $R^8$ are independently hydrogen, carboxyl, carboxylic acid derivative, $C_1$-$C_{10}$ alkyl, phenyl, benzyl, or an aromatic substituted with a $C_1$-$C_8$ alkyl; K is independently hydrogen or a 1/r metal of valency r and u, the average number of monomer units, may have a value of 1 to 20.

Examples of $R^1$ and $R^2$ include, but are not limited to, methyl, ethyl, n-propyl, isopropyl, n-butyl, tert-butyl, n-pentyl, and phenyl. Examples of $R^3$ include, but are not limited to, methylene, ethylene, n-propylene, isopropylene, n-butylene, tert-butylene, n-pentylene, n-octylene, n-dodecylene, phenylene, naphthylene, methylphenylene, ethylphenylene, tert-butylphenylene, methylnapthylene, ethytnapthylene, tert-butylnaphthylene, phenylethylene, phenylpropylene, and phenylbutylene.

The mono- and diphosphinates (formulas II and III respectively) may be prepared by reacting the corresponding phosphinic acid with a metal oxide and/or metal hydroxide in an aqueous medium as taught in EP 0 699 708.

The polymeric phosphinates (formula IV) may be prepared by reacting hypophosphorous acid and or its alkali metal salt with an acetylene of formula (V)

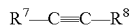 (V).

The resulting polymeric phosphinic acid or polymeric phosphinic acid salt is then reacted with a metal compound of groups IA, IIA, IIIA, IVA, VA, IIB, IVB, VIIB, VIIIB of the Periodic Table as taught in U.S. Patent Application No. 2003/0216533.

In one embodiment, $R^1$ and $R^2$ are ethyl.

In one embodiment the phosphinate is in particulate form. The phosphinate particles may have a median particle diameter (D50) less than or equal to 40 micrometers, or, more specifically, a D50 less than or equal to 30 micrometers, or, even more specifically, a D50 less than or equal to 25 micrometers. Additionally, the phosphinate may be combined with a polymer, such as a poly(arylene ether), a polyolefin, a polyamide, and/or an impact modifier, to form a masterbatch. The phosphinate masterbatch comprises the phosphinate in an amount greater than is present in the thermoplastic composition. Employing a masterbatch for the addition of the phosphinate to the other components of the composition can facilitate addition and improve distribution of the phosphinate.

The composition comprises an amount of phosphinate sufficient to achieve a flame retardance of V-1 or better at a thickness of 2.0 millimeters according to UL94. In one embodiment the composition comprises an amount of phosphinate sufficient to achieve a flame retardance of V-0 at a thickness of 2.0 millimeters according to UL94. For example, the composition may comprise phosphinate in an amount of 5 to 25 weight percent. Within this range, the phosphinate may be present in an amount greater than or equal to 7 weight percent, or, more specifically, in an amount greater than or equal to 8 weight percent, or, even more specifically, in an amount greater than or equal to 9 weight percent. Also within this range the phosphinate may be present in an amount less than or equal to 22 weight percent, or, more specifically, less than or equal to 17 weight percent, or, even more specifically, less than or equal to 15 weight percent. Weight percent is based on the total weight of the thermoplastic composition.

The composition may optionally comprise an inorganic compound such as an oxygen compound of silicon, a magnesium compound, a metal carbonate of metals of the second main group of the periodic table, red phosphorus, a zinc compound, an aluminum compound or a composition comprising one or more of the foregoing. The oxygen compounds of silicon can be salts or esters of orthosilicic acid and condensation products thereof; silicates; zeolites; silicas; glass powders; glass-ceramic powders; ceramic powders; or combinations comprising one or more of the foregoing oxygen compound of silicon. The magnesium compounds can be magnesium hydroxide, hydrotalcites, magnesium carbonates or magnesium calcium carbonates or a combination comprising one or more of the foregoing magnesium compounds. The red phosphorus can be elemental red phosphorus or a preparation in which the surface of the phosphorus has been coated with low-molecular-weight liquid substances, such as silicone oil, paraffin oil or esters of phthalic acid or adipic acid, or with polymeric or oligomeric compounds, e.g., with phenolic resins or amino plastics, or else with polyurethanes. The zinc compounds can be zinc oxide, zinc stannate, zinc hydroxystannate, zinc phosphate, zinc borate, zinc sulfides or a composition comprising one of more of the foregoing zinc compounds. The aluminum compounds can be aluminum hydroxide, aluminum phosphate, or a combination thereof.

In one embodiment, the inorganic compound comprises zinc borate.

The composition may optionally comprise a nitrogen compound or combination of nitrogen compounds. Exemplary nitrogen compounds include those having the formulas (VI) to (XI):

-continued

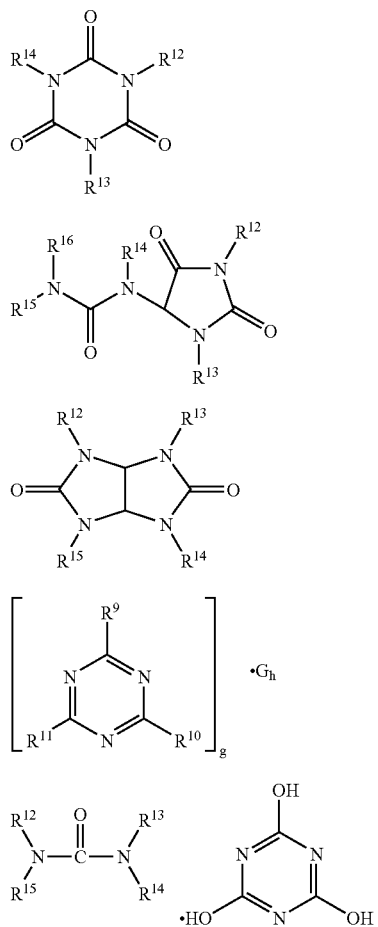

wherein $R^9$ to $R^{11}$ are independently hydrogen; $C_1$-$C_8$-alkyl; $C_5$-$C_{16}$-cycloalkyl unsubstituted or substituted with a hydroxyl function or with a $C_1$-$C_4$-hydroxyalkyl function; $C_5$-$C_{16}$-alkylcycloalkyl, unsubstituted or substituted with a hydroxyl function or with a $C_1$-$C_4$-hydroxyalkyl function; $C_2$-$C_8$-alkenyl; $C_2$-$_8$-alkoxy; $C_2$-$C_8$-acyl; $C_2$-$C_8$-acyloxy; $C_6$-$C_{12}$-aryl; $C_6$-$C_{12}$-arylalkyl; —$OR^{20}$; —$N(R^{20})R^{12}$; N-alicyclic; N-aromatic systems;

$R^{20}$ is hydrogen; $C_1$-$C_8$-alkyl; $C_5$-$C_{16}$-cycloalkyl, unsubstituted or substituted with a hydroxyl function or with a $C_1$-$C_4$-hydroxyalkyl function; $C_5$-$C_{16}$-alkylcycloalkyl, unsubstituted or substituted with a hydroxyl function or with a $C_1$-$C_4$-hydroxyalkyl function; $C_2$-$C_8$-alkenyl; $C_1$-$C_8$-alkoxy; $C_1$-$C_8$-acyl; $C_1$-$C_8$-acyloxy; $C_6$-$C_{12}$-aryl; or $C_6$-$C_{12}$-arylalkyl;

$R^{12}$ to $R^{16}$ are groups identical with $R^{20}$ or else —O—$R^{20}$, g and h, independently of one another, are 1, 2, 3 or 4, G is the residue of an acid which can form an adduct with triazine compounds (VI). The nitrogen compound may also be an ester of tris(hydroxyethyl) isocyanurate with aromatic polycarboxylic acids, a nitrogen-containing phosphate of the formula $(NH_4)_y H_{3-y}PO_4$ or $(NH_4PO_3)_z$, where y is from 1 to 3 and z is from 1 to 10,000 or a combination comprising one or more of the foregoing nitrogen compounds.

Exemplary nitrogen compounds include melamine polyphosphate, melem phosphate, melam phosphate, melamine pyrophosphate, melamine, melamine cyanurate, combinations comprising one or more of the foregoing, and the like.

The phosphinate is combined with a thermoplastic resin to form a flame retardant masterbatch. The masterbatch is used to form the composition. In one embodiment the thermoplastic resin used to form the masterbatch is a polyamide or a resin miscible with the polyamide. The resin has sufficiently low viscosity to blend with the phosphinate. The masterbatch may also comprise the optional inorganic compound, the optional nitrogen compound or a combination of the optional inorganic compound and the optional nitrogen compound. The masterbatch may comprise 20 to 80 weight percent phosphinate and 20 to 80 weight percent thermoplastic resin with respect to the combined weight of phosphinate and thermoplastic resin. Within this range the phosphinate may be present in the masterbatch in an amount greater than or equal to 25 weight percent, or, more specifically, greater than or equal to 30 weight percent. Also within this range the phosphinate may be present in the masterbatch in an amount less than or equal to 75 weight percent, or, more specifically, less than or equal to 70 weight percent.

The composition can be prepared melt mixing or a combination of dry blending and melt mixing. Melt mixing can be performed in single or twin screw type extruders or similar mixing devices which can apply a shear to the components.

A first mixture comprising the poly(arylene ether) and compatibilizing agent are melt mixed to form a first melt mixture. The first mixture may further comprise an impact modifier, a portion of the polyamide, or a combination of impact modifier and polyamide. The first melt mixture may be isolated or it may be further melt mixed with other components of the composition without isolation. When the first melt mixture is isolated it is typically in the form of pellets or other such form that can be readily handled.

In one embodiment, the poly(arylene ether) and compatibilizing agent are melt mixed to form a first melt mixture and isolated in a particulate form. A second mixture comprising the particulate first melt mixture and optionally a portion of polyamide is then melt mixed to form a second melt mixture that is further melt mixed with polyamide, the flame retardant masterbatch, and electrically conductive additive. The optional inorganic compound may be added at any point. The optional nitrogen compound may be added at any point. The impact modifier may be part of the second melt mixture or be added after the formation of the second melt mixture. When the composition comprises two impact modifiers they can be added together or separately.

In one embodiment, the poly(arylene ether), compatibilizing agent and optionally a portion of polyamide is melt mixed to form a first melt mixture that is further melt mixed with polyamide, the flame retardant masterbatch, and electrically conductive additive. The optional inorganic compound may be added at any point. The optional nitrogen compound may be added at any point. In one embodiment the optional inorganic compound, optional nitrogen compound or both are added with the flame retardant masterbatch or are part of the flame retardant masterbatch. The impact modifier may be part of the first melt mixture or be added after the formation of the first melt mixture. When the composition comprises two impact modifiers they can be added together or separately.

While separate extruders may be used in the processing, preparations in a single extruder having multiple feed ports along its length to accommodate the addition of the various components simplifies the process. It is often advantageous to apply a vacuum to the melt through one or more vent ports in the extruder to remove volatile impurities in the composition.

The electrically conductive additive may be added by itself, with other ingredients (optionally as a dry blend) or as part of a masterbatch. In one embodiment, the electrically conductive additive can be part of a masterbatch comprising polyamide. The electrically conductive additive may be added with the poly(arylene ether), with the polyamide (the second portion when two portions are employed), or after the addition of the polyamide (the second portion when two portions are employed). The electrically conductive additive may be part of the fire retardant masterbatch.

In one embodiment the composition comprises the reaction product of poly(arylene ether); polyamide; electrically conductive additive; compatibilizing agent; impact modifier; and phosphinate. As used herein a reaction product is defined as the product resulting from the reaction of two or more of the foregoing components under the conditions employed to form the composition, for example during melt mixing or high shear mixing.

After the composition is formed it is typically formed into strands which are cut to form pellets. The strand diameter and the pellet length are typically chosen to prevent or reduce the production of fines (particles that have a volume less than or equal to 50% of the pellet) and for maximum efficiency in subsequent processing such as profile extrusion. An exemplary pellet length is 1 to 5 millimeters and an exemplary pellet diameter is 1 to 5 millimeters.

The pellets may exhibit hygroscopic properties. Once water is absorbed it may be difficult to remove. Typically drying is employed but extended drying can affect the performance of the composition. Similarly water, above 0.01-0.1%, or, more specifically, 0.02-0.07% moisture by weight, can hinder the use of the composition in some applications. It is advantageous to protect the composition from ambient moisture. In one embodiment the pellets, once cooled to a temperature of 50° C. to 110° C., are packaged in a container comprising a monolayer of polypropylene resin free of a metal layer wherein the container has a wall thickness of 0.25 millimeters to 0.60 millimeters. The pellets, once cooled to 50 to 110° C. can also be packaged in foiled lined containers such as foil lined boxes and foil lined bags.

The composition may be converted to articles using low shear thermoplastic processes such as film and sheet extrusion, profile extrusion, extrusion molding, compression molding and blow molding. Film and sheet extrusion processes may include and are not limited to melt casting, blown film extrusion and calendaring. Co-extrusion and lamination processes may be employed to form composite multi-layer films or sheets. Single or multiple layers of coatings may further be applied to the single or multi-layer substrates to impart additional properties such as scratch resistance, ultra violet light resistance, aesthetic appeal, etc. Coatings may be applied through standard application techniques such as rolling, spraying, dipping, brushing, or flow-coating.

Oriented films may be prepared through blown film extrusion or by stretching cast or calendared films in the vicinity of the thermal deformation temperature using conventional stretching techniques. For instance, a radial stretching pantograph may be employed for multi-axial simultaneous stretching; an x-y direction stretching pantograph can be used to simultaneously or sequentially stretch in the planar x-y directions. Equipment with sequential uniaxial stretching sections can also be used to achieve uniaxial and biaxial stretching, such as a machine equipped with a section of differential speed rolls for stretching in the machine direction and a tenter frame section for stretching in the transverse direction.

The compositions may be converted to multiwall sheet comprising a first sheet having a first side and a second side, wherein the first sheet comprises a thermoplastic polymer, and wherein the first side of the first sheet is disposed upon a first side of a plurality of ribs; and a second sheet having a first side and a second side, wherein the second sheet comprises a thermoplastic polymer, wherein the first side of the second sheet is disposed upon a second side of the plurality of ribs, and wherein the first side of the plurality of ribs is opposed to the second side of the plurality of ribs.

The films and sheets described above may further be thermoplastically processed into shaped articles via forming and molding processes including but not limited to thermoforming, vacuum forming, pressure forming, injection molding and compression molding. Multi-layered shaped articles may also be formed by injection molding a thermoplastic resin onto a single or multi-layer film or sheet substrate as described below:

1. Providing a single or multi-layer thermoplastic substrate having optionally one or more colors on the surface, for instance, using screen printing or a transfer dye
2. Conforming the substrate to a mold configuration such as by forming and trimming a substrate into a three dimensional shape and fitting the substrate into a mold having a surface which matches the three dimensional shape of the substrate.
3. Injecting a thermoplastic resin into the mold cavity behind the substrate to (i) produce a one-piece permanently bonded three-dimensional product or (ii) transfer a pattern or aesthetic effect from a printed substrate to the injected resin and remove the printed substrate, thus imparting the aesthetic effect to the molded resin.

Those skilled in the art will also appreciate that common curing and surface modification processes including and not limited to heat-setting, texturing, embossing, corona treatment, flame treatment, plasma treatment and vacuum deposition may further be applied to the above articles to alter surface appearances and impart additional functionalities to the articles.

Accordingly, another embodiment relates to articles, sheets and films prepared from the compositions above.

Exemplary articles include all or portions of the following articles: furniture, partitions, containers, vehicle interiors including rail cars, subway cars, busses, trolley cars, airplanes, automobiles, and recreational vehicles, exterior vehicle accessories such as roof rails, appliances, cookware, electronics, analytical equipment, window frames, wire conduit, flooring, infant furniture and equipment, telecommunications equipment, antistatic packaging for electronics equipment and parts, health care articles such as hospital beds and dentist chairs, exercise equipment, motor covers, display covers, business equipment parts and covers, light covers, signage, air handling equipment and covers, automotive underhood parts.

In one embodiment the composition is extruded to form an article with a desired shape. The article can then be powder coated or painted if desired. Examples of such articles include caps for cubicle partitions, furniture parts, groove tiles (covered tracks for network wiring), conduits for electrical wires and the like.

The following non-limiting examples further illustrate the various embodiments described herein.

EXAMPLES

The following examples used the materials shown in Table 1. Weight percent, as used in the examples, is determined based on the total weight of the composition unless otherwise noted.

TABLE 1

| Material Name | Material Description/Supplier |
|---|---|
| PPE | A poly(2,6-dimethylphenylene ether) with an intrinsic viscosity of 0.46 dl/g as measured in chloroform at 25° C. commercially available from General Electric |
| SEBS | Polystyrene-poly(ethylene-butylene)-polystyrene commercially available as Kraton 1651 from Kraton Polymers |
| Nylon 6,6 | Polyamide having a 2.66 ml/g relative viscosity determined according to DIN 53727 (1.0 wt % solution in 96 wt % sulfuric acid) and commercially available from Solutia under the tradename Vydyne 21Z. |
| Nylon 6 #1 | Polyamide having a relative viscosity of 2.40 determined according to DIN 53727 (1.0 wt % solution in 96 wt % sulfuric acid) and commercially available from Rhodia under the tradename Technyl HSN 27/32-35 LC Natural. |
| Nylon 6 #2 | Polyamide having a relative viscosity of 2.85 determined according to DIN 53727 (1.0 wt % solution in 96 wt % sulfuric acid) and commercially available from Custom Resins under the tradename Nylene NX4512. |
| 1312 | A mixture of components comprising a phosphinate available commercially from Clariant corporation under the tradename Exolit OP 1312 |
| 1230 | A flame retardant comprising a phosphinate available commercially from Clariant corporation under the tradename Exolit OP 1230 |
| CCB | Electrically conductive carbon black commercially available from Akzo under the tradename Ketjen Black EC600JD. |
| RDP | Resorcinol diphosphate |
| TPP | Triphenyl phosphate |
| MC | Melamine cyanurate |
| BP | Boron phosphate |
| SF | Silicone fluid commercially available from GE Silicones under the tradename SF1706. |
| MWNT | Multi wall nanotubes having diameters of 10-30 nanometers and commercially available from Hyperion Catalysis |

Examples 1-7 and Comparative Examples 1-11

PPE, 0.1 weight percent (wt %) potassium iodide, 0.05 wt % copper iodide, 0.3 wt % Irganox 1076 commercially available from Ciba-Geigy, 0.6 wt % citric acid, and the nylon 6,6 were melt mixed to form a mixture. The mixture was further melt mixed with nylon 6 and a masterbatch of electrically conductive carbon black in nylon 6. In compositions containing Exolit OP 1312, SF, BP, TPP, RDP, MC or a combination of two or more of the foregoing, these materials were added with the polyphenylene ether at the feedthroat. The compositions were molded into bars having a thickness of 2.0 millimeters for flammability testing. Flammability tests were performed following the procedure of Underwriter's Laboratory Bulletin 94 entitled "Tests for Flammability of Plastic Materials, UL94". Each bar that extinguished was ignited twice. According to this procedure, the materials were classified as V0, V1 or V2 on the basis of the test results obtained for ten samples. If more than 3 of the first 5 bars had a burn time >30 seconds, then the burning was stopped at 5 bars. The criteria for each of these flammability classifications according to UL94, are, briefly, as follows.

V0: In a sample placed so that its long axis is parallel to the flame, the average period of flaming and/or smoldering after removing the igniting flame should not exceed ten seconds and none of the vertically placed samples should produce drips of burning particles which ignite absorbent cotton. For five bars, the total burn time, including all first burns and all second burns should not exceed 50 seconds.

V1: In a sample placed so that its long axis is parallel to the flame, the average period of flaming and/or smoldering after removing the igniting flame should not exceed thirty seconds and none of the vertically placed samples should produce drips of burning particles which ignite absorbent cotton. For five bars, the total burn time, including all first burns and all second burns should not exceed 250 seconds.

V2: In a sample placed so that its long axis is parallel to the flame, the average period of flaming and/or smoldering after removing the igniting flame should not exceed thirty seconds and the vertically placed samples produce drips of burning particles which ignite cotton. For five bars, the total burn time, including all first burns and all second burns should not exceed 250 seconds.

Results are shown in Table 2. Flame out time (FOT) is the average of the sum of the amounts of time the bar burned each time it was lit. "NA" in the UL94 rating column means that the sample did not fall within the parameters of any of the UL94 ratings.

Some examples were tested for specific volume resistivity (SVR). The compositions were molded into ISO tensile bars. The bars were scored at two points along the "neck" portion of the tensile bar at a distance of approximately 6.35 centimeters apart and then submerged in liquid nitrogen for approximately 5 minutes. As soon as the bars were removed from the liquid nitrogen they were snapped at the score marks. The ends were painted with electrically conductive silver paint and dried. Resistance was measured by placing the probes of a handheld multimeter (Fluke 187, True RMS Multimeter set to resistance) on each painted end of the bar. The resistivity was calculated as the resistance (in Ohms)×bar width (in centimeters (cm))×bar depth (cm) divided by the bar length (cm). Results are shown in Table 2. Comparative examples are noted as CE and examples are Ex.

Melt Volume rate was determined according to ISO 1133. Vicat B was determined according to ISO 306.

TABLE 2

| | CE 1 | CE 2 | CE 3 | CE 4 | CE 5 | CE 6 | Ex. 1 | Ex. 2 | Ex. 3 | Ex. 4 |
|---|---|---|---|---|---|---|---|---|---|---|
| Component | | | | | | | | | | |
| PPE | 49.90 | 42.64 | 42.64 | 42.64 | 47.21 | 49.00 | 44.34 | 48.0 | 42.0 | 42.0 |
| SEBS | 4.27 | 4.07 | 4.07 | 4.07 | 4.04 | 4.0 | 3.86 | 6.0 | 6.0 | 2.0 |
| Nylon 66 | 11.5 | 10.94 | 10.94 | 10.94 | 10.88 | 11.29 | 9.86 | 8.0 | 12.0 | 8.0 |
| Nylon 6 #1 | — | — | — | — | — | 22.98 | 29.35 | 27.0 | 27.0 | 33.0 |
| Nylon 6 #2 | 33.06 | 31.46 | 31.46 | 31.46 | 31.28 | 9.49 | — | — | — | — |
| CCB | — | — | — | — | — | 2.0 | 2.0 | 2.2 | 1.8 | 2.2 |
| 1312 | — | — | — | — | — | — | 9.34 | 7.55 | 9.95 | 11.55 |
| RDP | — | — | 9.68 | — | — | — | — | — | — | — |

TABLE 2-continued

| | | | | | | | | | | |
|---|---|---|---|---|---|---|---|---|---|---|
| TPP | — | — | — | 9.68 | — | — | — | — | — | — |
| MC | — | 9.68 | — | — | — | — | — | — | — | — |
| BP | — | — | — | — | 3.27 | — | — | — | — | — |
| SF | — | — | — | — | 2.12 | — | — | — | — | — |
| Physical properties | | | | | | | | | | |
| Melt Volume Rate | — | — | — | — | — | — | 9.0 | 5.9 | 10.8 | 12.6 |
| Vicat B | — | — | — | — | — | — | 194 | 183 | 186 | 194 |
| SVR | — | — | — | — | — | — | 299 | 204 | 641 | 142 |
| Avg. FOT | 100+ | 100+ | 100+ | 23.5 | 18.8 | 100+ | 4.8 | 3.9 | 3.9 | 3.9 |
| UL94 | NA | NA | NA | Near V1 | Near V1 | NA | V0 | V0 | V0 | V0 |

| | Ex. 5 | Ex. 6 | Ex. 7 | CE 7 | CE 8 | CE 9 | CE 10 | CE 11 |
|---|---|---|---|---|---|---|---|---|
| Component | | | | | | | | |
| PPE | 42.95 | 48.0 | 42.0 | 43.74 | 40.21 | 39.61 | 39.61 | 48.95 |
| SEBS | 6.0 | 2.0 | 6.0 | 3.97 | 3.92 | 3.96 | 3.96 | 4.2 |
| Nylon 66 | 8.0 | 8.0 | 12.0 | 11.22 | 11.07 | 11.18 | 11.18 | 11.3 |
| Nylon 6 #1 | 27.0 | 27.0 | 27.0 | 22.84 | 22.53 | 22.75 | 22.75 | 32.5 |
| Nylon 6 #2 | — | — | — | 9.43 | 9.3 | 9.4 | 9.4 | — |
| CCB | 1.8 | 1.8 | 1.8 | 1.99 | 1.96 | 1.98 | 1.98 | 1.8 |
| 1312 | 13.0 | 11.95 | 9.95 | — | — | — | — | — |
| RDP | — | — | — | — | — | 9.89 | — | — |
| TPP | — | — | — | — | — | — | 9.89 | — |
| MC | — | — | — | — | 9.79 | — | — | — |
| BP | — | — | — | 3.38 | — | — | — | — |
| SF | — | — | — | 2.18 | — | — | — | — |
| Physical properties | | | | | | | | |
| Melt Volume Rate | 9.8 | 10.4 | 10.8 | — | — | — | — | 10.2 |
| Vicat B | 181 | 195 | 186 | — | — | — | — | 198 |
| SVR | 386 | 284 | 641 | — | — | — | — | 23832 |
| Avg. FOT | 3.9 | 4.2 | 3.9 | 49.8 | 100+ | 100+ | 45.9 | 100+ |
| UL94 | V0 | V0 | V0 | NA | NA | NA | NA | NA |

Comparative Examples 1-5 demonstrate flame retardance behavior of several blends that do not contain electrically conductive carbon black. Comparative Example 1 shows a generic compatibilized polyamide/poly(arylene ether) blend. No flame retarding additives were present. The flame retardance is poor, with an average flame out time (FOT) per bar greater than 100 seconds. Other well known flame retardants were added in similar loadings in Comparative Examples 2 through 5. Comparative Example 2 with melamine cyanurate and Comparative Example 3 with resorcinol diphosphate both had average FOT greater than 100 seconds. Comparative Example 4, with triphenylphosphate, had an average FOT of 23.5 seconds, which begins to approach V-1 performance. However several of the individual burn times were longer than 30 seconds and therefore the material received no rating. Finally, a combination of boron phosphate and silicone fluid (Comparative Example 5) produced a sample with an average FOT of 18.8 seconds. This sample also was very close to but did not meet V-1 criteria in that one burn time was longer than 30 seconds.

Comparative Examples 6-11 demonstrate the flame retardance behavior of several blends that contain electrically conductive carbon black. Comparative Example 6 is an example of an electrically conductive compatibilized polyamide/poly(arylene ether) blend without flame retardants. As can be seen, the flame retardancy is very poor with an average FOT greater than 100 seconds per bar. Comparative Example 7 includes the same boron phosphate/silicone fluid flame retardant system as in Comparative Example 5. Here the average FOT per bar is now 48.8 seconds where without the electrically conductive carbon black, it was 18.8 seconds. This shows that the inclusion of the electrically conductive carbon black actually decreases the overall flame retardance performance of the blend. Similarly Comparative Example 10 uses TPP as the flame retardance agent. This blend can be compared to Comparative Example 4. With the electrically conductive carbon black in the blend, the average FOT per bar increases from 23.5 seconds to 45.9 seconds.

Examples 1 through 7 show blends that contain a phosphinate. All three samples for each of these examples show a total average FOT below 5 seconds per bar, even including from 1.8 to 2.2 parts of electrically conductive carbon black. So, use of a phosphinate provides V-0 performance in the electrically conductive blends. This is contrast to the flame retardants used in the comparative examples that all showed non-V-0 performance with the addition of the electrically conductive carbon black to the blends.

Additionally, a comparison of the specific volume resistivity of Comparative Example 11 (approximately 24000 Ohm-cm) to the specific volume resistivity of Examples 1 through 7 shows that similar blends that have the same level of carbon black, but which also include phosphinate exhibit markedly lower resistivity. In all of Examples 1 through 7, the resistivity decreases by at least 97%. So, the inclusion of phosphinate also unexpectedly reduces the resistivity, or increases the conductivity, of the compatibilized poly(arylene ether)/polyamide blends.

Examples 8-27

The examples were made using the compositions shown in Table 4 in a 30 millimeter extruder. The order of addition of the components is also shown in Table 4. The abbreviation U/S means that the component was added upstream either in the feedthroat or using a feeder located at the feedthroat. The abbreviation D/S means that the component was added downstream to a melt mixture formed by the components added upstream. The flame retardant masterbatch (FR/N6) comprised 40 weight percent OP 1230 and 60 weight percent Nylon 6 #1 based on the combined weight of OP1230 and nylon. The abbreviation CCBMB means that the conductive carbon black was part of a masterbatch. The CCBMB consisted of 10 weight percent carbon black and 90 weight percent Nylon 6 #1, based on the combined weight of the carbon black and nylon. The compositions contained 0.3 weight percent (wt %) potassium iodide, 0.05 wt % copper iodide, 0.3 wt % Irganox 1076 commercially available from Ciba-Geigy, 0.8 wt % citric acid, all of which were added upstream. The total weight of all components is 100.25 in each example.

Flammability results are reported as "probability of first time pass" or p(FTP). Twenty bars of each composition were molded and burned according the UL 94 method and the average and standard deviation of the flame out times was used to calculate the probability that in the standard test of five bars the sample would have passed. A 90% probability of passing the first time (i.e., p(FTP) of 0.9) is considered acceptable performance. Values significantly lower than 0.9 are considered unacceptable. p(FTP) is calculated only for samples that do not fail by dripping. Flammability results were obtained for bars with a thickness of 2.0 millimeters.

Physical property testing was done using the methods listed in Table 3 using the units also reported in Table 3. Specific volume resistivity (SVR) was determined as described above and is reported in ohm-centimeters (ohm-cm).

TABLE 3

| Test | Test Method | Unit |
|---|---|---|
| Notched Izod at 23° C. | ISO 1801A | Kilojoules per square meter (kJ/m$^2$) |
| Unnotched Izod at 23° C. | ISO 1801A | Kilojoules per square meter (kJ/m$^2$) |
| Chord Modulus | ISO 527 | Megapascals (Mpa) |
| Stress at Yield | ISO 527 | MPa |
| Stress at Break | ISO 527 | MPa |
| Strain at Break | ISO 527 | % |
| Softening temp | ISO 306 | ° C. |

TABLE 4

| Component | Point of addition | 8 | 9 | 10 | 11 | 12 | 13 | 14 | 15 | 16 | 17 |
|---|---|---|---|---|---|---|---|---|---|---|---|
| PPE | U/S | 39.15 | 38.25 | 37.30 | 36.40 | 35.50 | 39.15 | 38.25 | 37.30 | 36.40 | 35.50 |
| SEBS | U/S | 4.00 | 4.00 | 4.00 | 4.00 | 4.00 | 4.00 | 4.00 | 4.00 | 4.00 | 4.00 |
| Exolit OP 1230 | U/S | 6.00 | 8.00 | 10.00 | 12.00 | 14.00 | — | — | — | — | — |
| Nylon 6/6 | U/S | 10.00 | 10.00 | 10.00 | 10.00 | 10.00 | 10.00 | 10.00 | 10.00 | 10.00 | 10.00 |
| FR/N6 | U/S | — | — | — | — | — | — | — | — | — | — |
| CCBMB | D/S | 17.00 | 17.00 | 17.00 | 17.00 | 17.00 | 17.00 | 17.00 | 17.00 | 17.00 | 17.00 |
| Nylon 6 | D/S | 21.65 | 20.55 | 19.50 | 18.40 | 17.30 | 21.65 | 20.55 | 19.50 | 18.40 | 17.30 |
| FR/N6 | D/S | — | — | — | — | — | — | — | — | — | — |
| Exolit OP 1230 | D/S | — | — | — | — | — | 6.00 | 8.00 | 10.00 | 12.00 | 14.00 |
| Notched Izod | | 11.6 | 11.3 | 8.9 | 7.3 | 6.6 | 5.9 | 5.8 | 5.1 | 4.9 | 4.5 |
| Unnotched Izod | | 122.9 | 105.6 | 91.8 | 77.5 | 63.3 | 33.0 | 38.4 | 48.2 | 55.9 | 49.4 |
| SVR | | 9901 | 51360 | 4023 | 4626 | 4755 | 7646 | 4997 | 2797 | 2417 | 1396 |
| Chord Modulus | | 2691 | 2846 | 2929 | 2968 | 2952 | 2877 | 2976 | 3043 | 3117 | 3186 |
| Stress at Yield | | 59.06 | 57.72 | 57.76 | 56.5 | 55.9 | 57.72 | 56.94 | 55.46 | 52.57 | 52.18 |
| Stress at Break | | 53.46 | 52.82 | 53.11 | 52.39 | 52.83 | 56.35 | 55.94 | 54.63 | 51.67 | 51.92 |
| Strain at Break | | 26.4 | 17.7 | 17.3 | 17.8 | 14.8 | 14.1 | 10.6 | 8.5 | 9.7 | 4.5 |
| Softening temp | | 197 | 199 | 196 | 197 | 196 | 191 | 190 | 191 | 189 | 189 |
| p(FTP) of V0 at 2.0 millimeters | | 0 | 0 | 0.1 | 0.8 | 0.9 | 0 | 0 | 0.1 | 0.4 | 0.8 |

| Component | 18 | 19 | 20 | 21 | 22 | 23 | 24 | 25 | 26 | 27 |
|---|---|---|---|---|---|---|---|---|---|---|
| PPE | 39.15 | 38.25 | 37.30 | 36.40 | 35.50 | 39.15 | 38.25 | 37.30 | 36.40 | 35.50 |
| SEBS | 4.00 | 4.00 | 4.00 | 4.00 | 4.00 | 4.00 | 4.00 | 4.00 | 4.00 | 4.00 |
| Exolit OP 1230 | — | — | — | — | — | — | — | — | — | — |
| Nylon 6/6 | 10.00 | 10.00 | 10.00 | 10.00 | 6.30 | 10.00 | 10.00 | 10.00 | 10.00 | 6.30 |
| FR/N6 | — | — | — | — | — | 15.00 | 20.00 | 25.00 | 30.00 | 35.00 |
| CCBMB | 17.00 | 17.00 | 17.00 | 17.00 | 17.00 | 17.00 | 17.00 | 17.00 | 17.00 | 17.00 |
| Nylon 6 | 12.65 | 8.55 | 4.50 | — | — | 12.65 | 8.55 | 4.50 | — | — |
| FR/N6 | 15.00 | 20.00 | 25.00 | 30.00 | 35.00 | — | — | — | — | — |
| Exolit OP 1230 | — | — | — | — | — | — | — | — | — | — |
| Notched Izod | 14.1 | 13.2 | 11.1 | 9.8 | 8.3 | 9.6 | 8.6 | 7.5 | 6.1 | 5.6 |
| Unnotched Izod | 118.2 | 103.4 | 88.6 | 72.1 | 62.1 | 83.4 | 62.6 | 60.2 | 44.8 | 41.3 |
| SVR | 6122 | 7163 | 5699 | 4713 | 6852 | 4107 | 3666 | 2257 | 1496 | 2037 |
| Chord Modulus | 2801 | 2877 | 2933 | 3027. | 3114 | 2645 | 2838 | 2906 | 3002 | 3134 |
| Stress at Yield | 59.51 | 58.9 | 56.23 | 55.63 | 55.14 | 58.68 | 57.37 | 55.96 | 54.61 | 54.14 |
| Stress at Break | 54.75 | 54.56 | 52.28 | 53.53 | 52.5 | 55.56 | 55.11 | 55.33 | 54.64 | 54.14 |
| Strain at Break | 22.1 | 20.1 | 17.6 | 12.2 | 11.2 | 13.2 | 9.7 | 5.4 | 3.5 | 3.1 |
| Softening temp | 196.2 | 195.9 | 196.4 | 196 | 196 | 195 | 197 | 197 | 197 | 195 |
| p(FTP) of V0 at 2.0 millimeters | 0.2 | 0.3 | 0.9 | 1.0 | 1.0 | 0 | 0.1 | 0.4 | 0.8 | 0.9 |

In Examples 8-12 the phosphinate was not part of a masterbatch and was added at the feed throat. Good flame retardance behavior (p(FTP)>0.9 for V0 at 2 millimeters) could only be achieved with 14.0 wt % of phosphinate. The composition showed a significant loss of impact strength in both the notched and unnotched Izod tests. In Examples 13-17 the phosphinate was not part of a masterbatch and was added downstream. Good flame retardance could not be achieved, even with 14.0 wt % of phosphinate. In contrast, Examples 18-22 show robust flame retardance at lower loadings of phosphinate and higher notched and unnotched Izod values than Example 12. The phosphinate was added downstream as part of a masterbatch in Examples 18-22. Examples 23-27 show that a masterbatch added upstream yields results that are no better than the phosphinate added upstream without being part of a masterbatch.

Examples 28-31

The examples were made using the compositions shown in Table 5 in a 30 millimeter extruder. The order of addition of the components is also shown in Table 5. The abbreviation U/S means that the component was added upstream either in the feedthroat or using a feeder located at the feedthroat. The abbreviation D/S means that the component was added downstream to a melt mixture formed by the components added upstream. The MWNT were added as part of a masterbatch (MWNT MB). The MWNT masterbatch consisted of 20 weight percent multi-wall nanotubes and 80 weight percent Nylon 6,6, based on the combined weight of the MWNT and nylon. The compositions contained 0.3 weight percent (wt %) potassium iodide, 0.05 wt % copper iodide, 0.3 wt % Irganox 1076 commercially available from Ciba-Geigy, 0.8 wt % citric acid, all of which were added upstream.

Physical property testing was done using the methods listed in Table 3 using the units also reported in Table 3. Specific volume resistivity (SVR) was determined as described above and is reported in ohm-centimeters (ohm-cm).

TABLE 5

|  |  | 28 | 29 | 30 | 31 |
|---|---|---|---|---|---|
| PPE | U/S | 35.50 | 37.50 | 39.50 | 41.50 |
| SEBS | U/S | 4.00 | 4.00 | 4.00 | 4.00 |
| Exolit OP 1230 | U/S | 14.00 | 12.00 | 10.00 | 8.00 |
| Nylon 6/6 | U/S | 10.00 | 10.00 | 10.00 | 10.00 |
| Nylon 6 | D/S | 28.30 | 28.30 | 28.30 | 28.30 |
| MWNT MB | D/S | 6.00 | 6.00 | 6.00 | 6.00 |
| Notched Izod | — | 10.2 | 10.4 | 10.3 | 12.1 |
| Unnotched Izod | — | NB | NB | NB | NB |
| SVR | — | 2456 | 3970 | 2145 | 1965 |
| Chord Modulus | — | 3507 | 3334 | 3597 | 3204 |
| Stress at Break | — | 53.1 | 52.2 | 52.6 | 54.4 |
| Strain at Break | — | 31.6 | 41.3 | 50.42 | 34.2 |
| Softening temp | — | 197.3 | 197.7 | 197 | 198 |
| p(FTP) of V0 at 2.0 millimeters | — | 1.000 | 1.000 | 1.000 | 0.867 |

NB = no break

Examples 28-31 show the impact of the choice of electrically conductive additive on the flammability and physical properties of the composition. Examples 28-31 use 1.2 weight percent of MWNT with respect to the total weight of the composition and achieve comparable conductivity to compositions employing 1.7-2.2 weight percent conductive carbon black. The reduction in the amount of electrically conductive additive appears to have a significant effect on the flame retardance behavior of the composition—excellent flame retardance can be achieved by adding the phosphinate upstream. Additionally, physical properties such as the impact strength are improved.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method of making a composition comprises:
   melt mixing a first mixture comprising a poly(arylene ether) and a compatibilizing agent to form a first melt mixture;
   melt mixing a second mixture comprising the first melt mixture and a polyamide, electrically conductive additive and a flame retardant masterbatch wherein the flame retardant masterbatch comprises a phosphinate and a thermoplastic resin, wherein the flame retardant masterbatch comprises 20-80 weight percent phosphinate and 20-80 weight percent thermoplastic resin with respect to the combined weight of phosphinate and thermoplastic resin.

2. The method of claim 1 wherein the first melt mixture is isolated.

3. The method of claim 1 wherein the first mixture further comprises an impact modifier.

4. The method of claim 1 wherein the first mixture further comprises polyamide.

5. The method of claim 1 wherein the electrically conductive additive is part of a masterbatch.

6. The method of claim 1 wherein the electrically conductive additive is part of the flame retardant masterbatch.

7. The method of claim 1, wherein the thermoplastic resin in the flame retardant masterbatch comprises polyamide or a resin miscible with polyamide.

8. The method of claim 1, wherein the flame retardant masterbatch further comprises an inorganic compound, a nitrogen compound or an inorganic compound and a nitrogen compound.

9. The method of claim 1 wherein the composition has a melt volume rate less than or equal to 25 cubic centimeters/10 min as determined by Melt Volume Rate test ISO 1133 performed at 300° C. with a load of 5 kilograms (kg).

10. The method of claim 1 wherein the composition has a Vicat B120 greater than or equal to 170° C. as determined by ISO 306.

11. The method of claim 1, wherein the composition has a specific volume resistivity less than or equal to $10^6$ ohm-cm.

12. The method of claim 1, wherein the poly(arylene ether) has a glass transition temperature of 160° C. to 250° C.

13. The method of claim 1 wherein the poly(arylene ether) is present in an amount of 15 to 60 weight percent, based on the total weight of the composition.

14. The method of claim 1 wherein greater than or equal to 50 weight percent of the polyamide, based on the total weight of the polyamide, has a melt temperature within 35% of the glass transition temperature of the poly(arylene ether).

15. The method of claim 1 wherein greater than or equal to 50 weight percent of the polyamide, based on the total weight of the polyamide, has a melt temperature within 25% of the glass transition temperature of the poly(arylene ether).

16. The method of claim 1 wherein the electrically conductive additive comprises electrically conductive carbon black, carbon nanotubes, carbon fibers or a combination of the two or more of the foregoing.

17. The method of claim 1 wherein the phosphinate has the formula

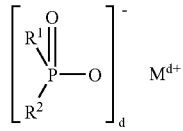

wherein $R^1$ and $R^2$ are independently $C_1$-$C_6$ alkyl, phenyl, or aryl; M is calcium, magnesium, aluminum, zinc or a combination comprising one or more of the foregoing; and d is 2 or 3.

18. The method of claim 15 wherein $R^1$ and $R^2$ are ethyl.

19. The method of claim 1, wherein the composition has a V-1 rating or better at a thickness of 2.0 millimeters according to UL94.

20. A composition produced by a method comprising:
melt mixing a first mixture comprising a poly(arylene ether) and a compatibilizing agent to form a first melt mixture;
melt mixing a second mixture comprising the first melt mixture and a polyamide, electrically conductive additive and a flame retardant masterbatch wherein the flame retardant masterbatch comprises a phosphinate and a thermoplastic resin, wherein the flame retardant masterbatch comprises 20-80 weight percent phosphinate and 20-80 weight percent thermoplastic resin with respect to the combined weight of phosphinate and thermoplastic resin.

21. An article comprising a composition produced by a method comprising:
melt mixing a first mixture comprising a poly(arylene ether) and a compatibilizing agent to form a first melt mixture;
melt mixing a second mixture comprising the first melt mixture and a polyamide, electrically conductive additive and a flame retardant masterbatch wherein the flame retardant masterbatch comprises a phosphinate and polyamide, wherein the flame retardant masterbatch comprises 20-80 weight percent phosphinate and 20-80 weight percent thermoplastic resin with respect to the combined weight of phosphinate and thermoplastic resin.

22. The article of claim 21 wherein the article is profile extruded.

23. The article of claim 21 wherein the article is a cap for a cubicle partition, a groove tile, or a conduit for one or more electrical wires.

* * * * *